US007777606B2

(12) United States Patent
Akbar et al.

(10) Patent No.: US 7,777,606 B2
(45) Date of Patent: Aug. 17, 2010

(54) FRACTURE CLUSTER MAPPING

(75) Inventors: Mahmood Akbar, Al Khobar (SA); Oki Musakti, Jakarta (ID); Lars Sonneland, Tananger (NO); Stein Inge Pedersen, Cambridge, MA (US)

(73) Assignee: WesternGeco L.L.C., Houston, TX (US)

( * ) Notice: Subject to any disclaimer, the term of this patent is extended or adjusted under 35 U.S.C. 154(b) by 588 days.

(21) Appl. No.: 11/737,638

(22) Filed: Apr. 19, 2007

(65) Prior Publication Data

US 2008/0225640 A1 Sep. 18, 2008

Related U.S. Application Data

(60) Provisional application No. 60/884,110, filed on Jan. 9, 2007.

(51) Int. Cl.
*G01V 1/00* (2006.01)
(52) U.S. Cl. .......................... 337/35; 367/31
(58) Field of Classification Search .................. 367/25, 367/31, 35, 53; 702/14
See application file for complete search history.

(56) References Cited

U.S. PATENT DOCUMENTS

| | | | |
|---|---|---|---|
| 7,386,431 B2 * | 6/2008 | Siebrits et al. ................ 703/10 |
| 7,457,194 B2 * | 11/2008 | Prioul et al. ................... 367/25 |
| 2002/0126896 A1 | 9/2002 | Pedersen | |
| 2006/0081412 A1 * | 4/2006 | Wright et al. ................ 181/104 |
| 2008/0130407 A1 * | 6/2008 | Akhtar .......................... 367/9 |

FOREIGN PATENT DOCUMENTS

GB 2 375 448 11/2002

OTHER PUBLICATIONS

Neves et al. "Distribution of potential fractures and small faults ising seismic attributes", The Leading Edge, Sep. 2004, pp. 903-906; http://scitation.aip.org/getpdf/servlet/GetPDFServlet?filetype=pdf&id=LEEDFF000023000009000903000001&idtype=cvips&prog=normal.*
Neves et al., "Detection of potential fractures and small faults using seismic attributes", The Leading Edge, Sep. 2004, pp. 903-906.*
Lingley, "A workflow change to understanding faulting in complex reservoirs," Science-Technology Conference "30 Years Petroleum Industry: New Challenges and Opportunities" pp. 1-12, Aug. 24-25, 2005.

* cited by examiner

*Primary Examiner*—Scott A Hughes
*Assistant Examiner*—Krystine Breier

(57) ABSTRACT

Method for identifying one or more fracture clusters in an area of interest. In one implementation, the method may include determining a first inclination of each fracture cluster using borehole data. The first inclination refers to a first average angle with respect to horizontal. The method may further include extracting a first set of fracture clusters from seismic data using a filter based on the first inclination and a strike azimuth of each fracture cluster.

23 Claims, 9 Drawing Sheets

Input Seismic Attribute: Dip_Deviation

Filters:
Strike Azimuth: 0-360
Inclination >75

Time slice at xxx ms    2 km

Filters:
Strike Azimuth:
 330-030 & 150-210
Inclination >75

Filters:
Strike Azimuth:
 090-150 & 270-330
Inclination >75

Filters:
Strike Azimuth:
 030-090 & 210-270
Inclination >75

Time slice at xxx ms    2 km

Input Seismic Attribute:
Dip_Deviation

Filters:
Strike Azimuth: 330-030 & 150-210
Inclination >75

Input Seismic Attribute:
Dip_Deviation

Filters:
Strike Azimuth: 090-150 & 270-330
Inclination >75

Input Seismic Attribute:
Dip_Deviation

Filters:
Strike Azimuth: 030-090 & 210-270
Inclination >75

FRACTURE CLUSTER MAPPING

CROSS-REFERENCE TO RELATED APPLICATIONS

This application claims benefit of U.S. provisional patent application Ser. No. 60/884,110, filed Jan. 9, 2007, which is incorporated herein by reference.

BACKGROUND

1. Field of the Invention

Implementations of various technologies described herein generally relate to sub-surface mapping in the oil and gas industry.

2. Description of the Related Art

The following descriptions and examples are not admitted to be prior art by virtue of their inclusion within this section.

Implementations of various techniques described herein are directed to mapping fracture clusters that exist in formations in the earth in an area of interest. In the oil and gas industry, wells may be drilled to extract hydrocarbons from reservoirs in the earth. Fractures intersecting drilled wells may assist the flow of hydrocarbons from the reservoir to which the fractures are connected and thereby increase production. Likewise, fractures may allow water to flow into wells decreasing hydrocarbon production. Therefore knowledge of fracture clusters locations may greatly assist in planning the locations of new wells.

Locations for new wells are typically selected based on various factors including discrete fracture network (DFN) models constructed by mapping fractures in the areas of interest. DFN models are 3-dimensional (3D) models of earth formations with expected fractures in an area. DFN models may be created by extrapolating fractures in inter-well spaces and interpolating fractures in areas between well controls based on theoretical models and statistical methods. Vertical and horizontal extents of these fractures may then be estimated based on structural or geo-statistical models that may or may not be accurate. Typically, 3D seismic data is not utilized in fracture mapping, even when available, because seismic data is not typically recorded at a coarse enough resolution to detect discrete fractures. Therefore, the current methods for fracture mapping and creating DFN models may be prone to error. A need exists in the art for an improved method to map fractures and construct DFN models.

SUMMARY

Described herein are implementations of various technologies for a method for identifying one or more fracture clusters in an area of interest. In one implementation, the method may include determining a first inclination of each fracture cluster using borehole data. The first inclination refers to a first average angle with respect to horizontal. The method may further include extracting a first set of fracture clusters from seismic data using a filter based on the first inclination and a strike azimuth of each fracture cluster.

Described herein are implementations of various technologies for a computer system having a processor and a memory comprising program instructions executable by the processor to: (a) determine one or more strike azimuths of each fracture cluster using borehole data; and (b) extract one or more fracture clusters from seismic data using one or more filters based on the strike azimuths.

Described herein are implementations of various technologies for a computer-readable medium having stored thereon computer-executable instructions which, when executed by a computer, cause the computer to: (a) determine a mode of occurrence for each fracture in an area of interest; (b) determine one or more strike azimuths and one or more inclinations for each fracture cluster; and (c) extract one or more three dimensional volumes of fracture clusters from seismic data using one or more filters based on the one or more strike azimuths and one or more inclinations.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

In general, one or more implementations of various technologies described herein are directed to a method for mapping fracture clusters in an area of interest. In this method, surface seismic data may be used in association with borehole data to map fracture clusters rather than individual/discrete fractures. When fractures exist in the form of clusters of larger dimensions, e.g., greater than 10 meters in width and height, these clusters may be detectable in seismic data, thereby allowing seismic data to be used for fracture cluster mapping.

In one implementation, borehole data may be used to assess the known fractures in an area to determine fracture occurrence, type, inclination and strike. Discontinuity extraction software (DES) may then be utilized to extract 3D volumes of fracture clusters. The DES processing may be run separately for different strike azimuth and inclination ranges. Each run of the DES may generate a 3D volume of fracture clusters. The 3D volumes may be combined into one 3D volume. In this manner, a 3D volume of fracture cluster distribution may be obtained, where each fracture cluster may have a strength, width, length and height. The strength and width of each DES fracture cluster may represent the intensity of the fractures, which can be translated into numbers representing fracture density. The fracture cluster strike azimuth, inclination, density, length, height and the like may be used for mapping fracture clusters, making comprehensive DFN models, future well planning, well-stability predictions, productivity index and the like. One or more techniques for mapping fracture clusters in an area of interest in accordance with various implementations are described in more detail with reference to FIGS. 1-12 in the following paragraphs.

Figure 1:
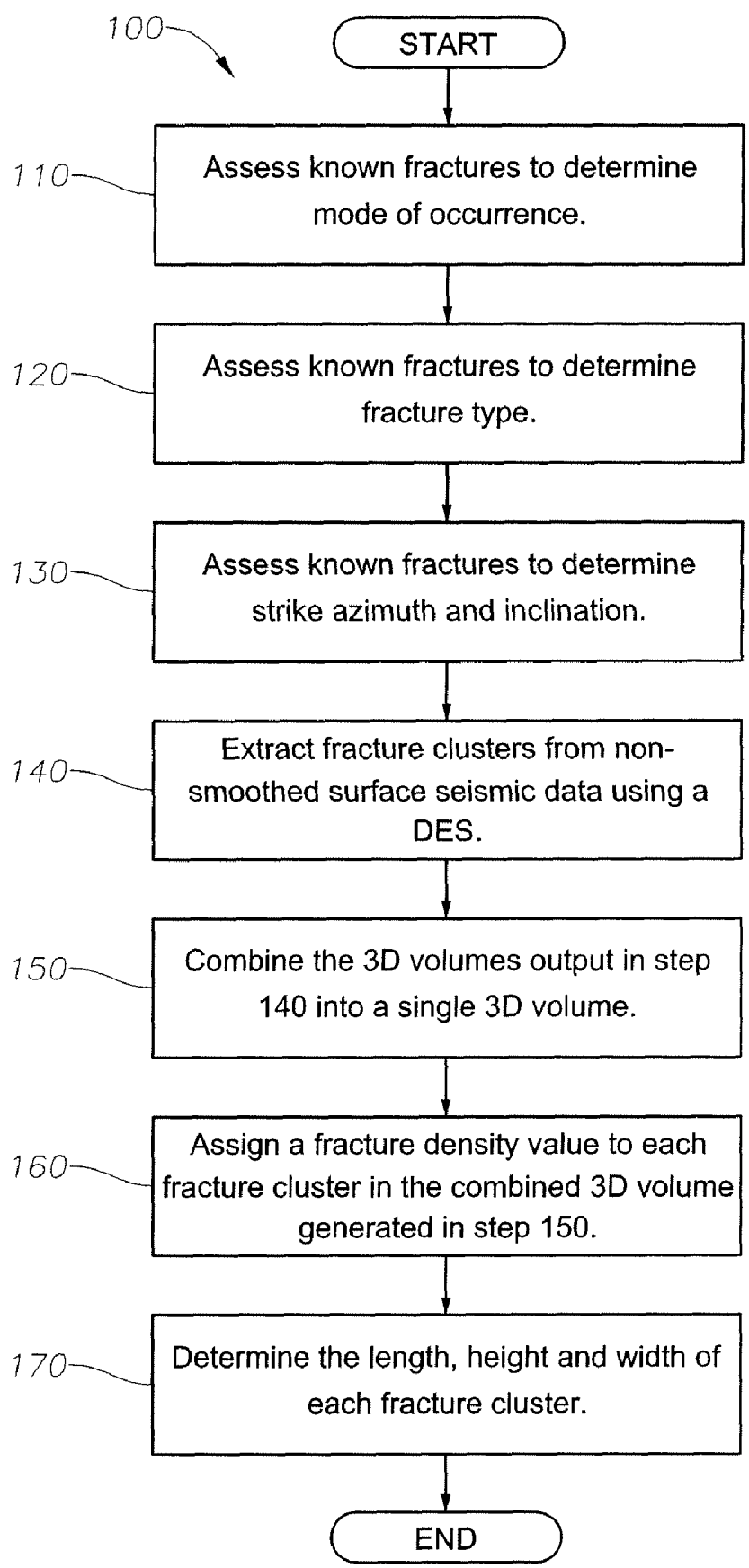
FIG. 1 illustrates a flow diagram for a method for mapping fracture clusters in accordance with implementations of various technologies described herein.

FIG. 1 illustrates a flow diagram of a method 100 for mapping fracture clusters in accordance with implementations of various technologies described herein. It should be understood that while the operational flow diagram 100 indicates a particular order of execution of the operations, in other implementations, the operations might be executed in a different order.

Figure 2:
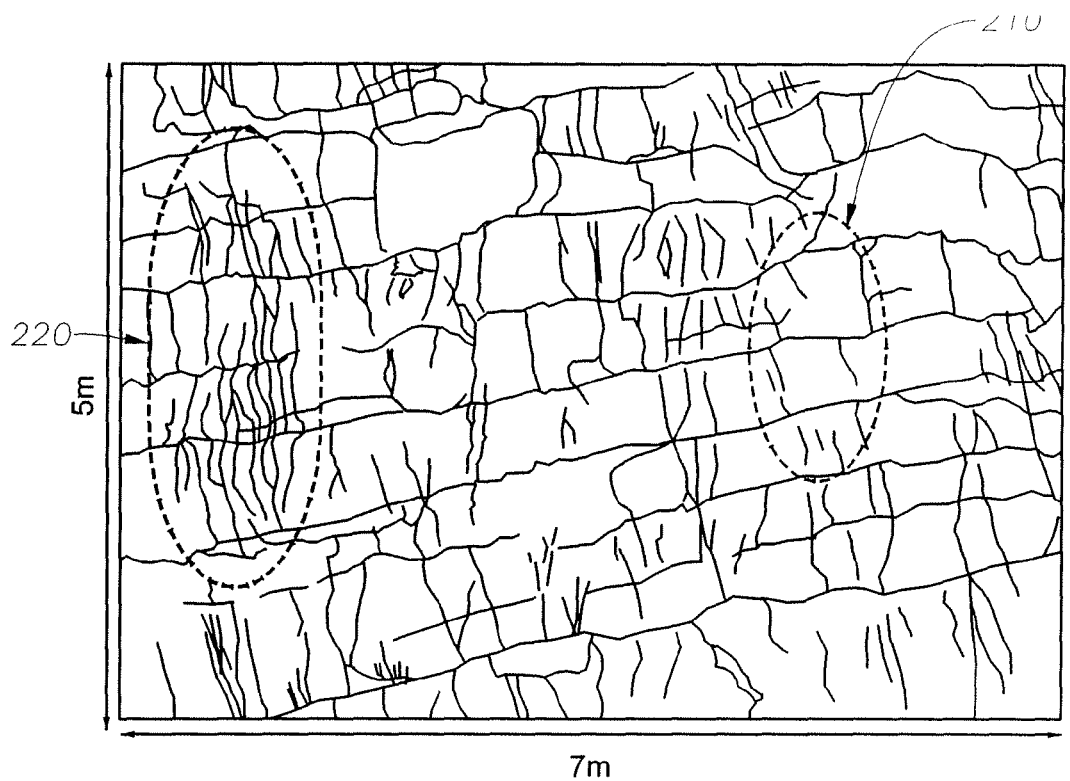
FIG. 2 illustrates an area with discrete fractures and an area with fracture clusters in connection with implementations of various technologies described herein.
Figure 3:
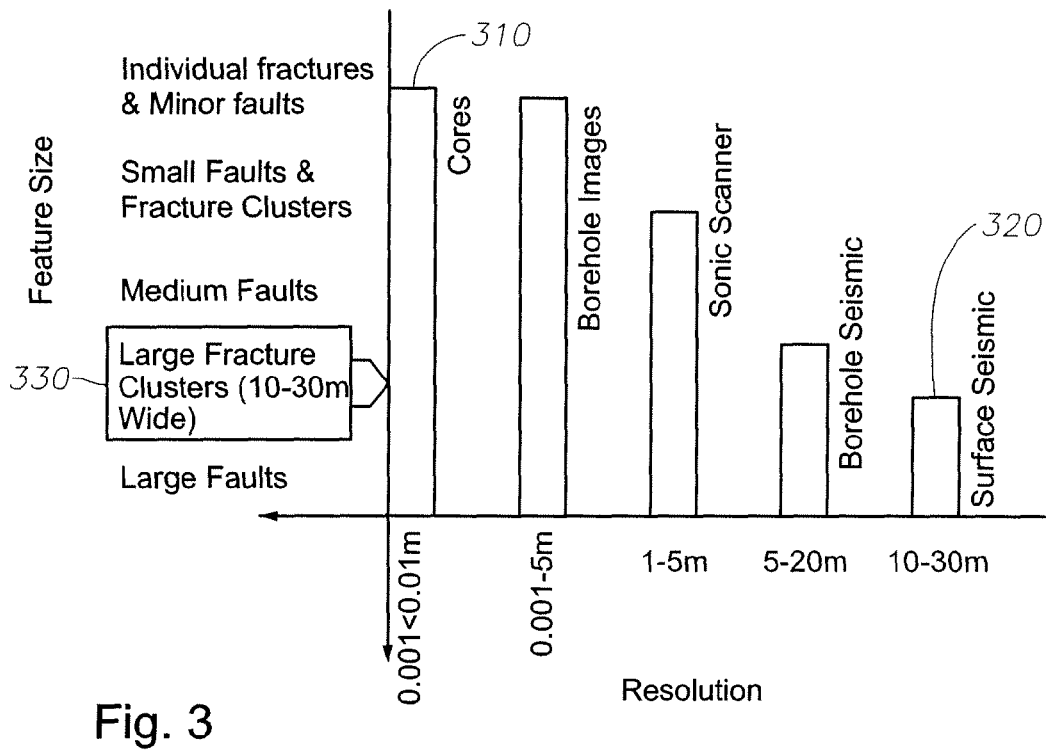
FIG. 3 illustrates features that may be recorded by various techniques used to gather subsurface feature data in connection with implementations of various technologies described herein.

At step 110, the known fractures in the area of interest may be assessed to determine the mode of fracture occurrence. The mode of fracture occurrence refers to both the fracture size and whether the fractures exist as individual/discrete fractures or clusters of fractures. FIG. 2 illustrates an area with discrete fractures 210 and an area with fracture cluster 220 in connection with implementations of various technologies described herein. The mode of fracture occurrence may be used to determine whether the fractures would be detectable in surface seismic data. Because discrete fractures may generally have smaller dimensions and cause minimal disturbance to the strata, they may not be detectable in surface seismic data. However, when fractures form clusters, they may have sufficient widths (i.e., distance between the bounding fractures of a cluster, measured along the line normal to those fractures' planes) and heights. If fracture clusters have widths and heights greater than approximately 10 meters to 30 meters, depending on the resolution of the surface seismic data, they may be detectable in surface seismic data. FIG. 3 illustrates features that may be recorded by various techniques used to gather subsurface feature data in connection with implementations of various technologies described herein. For example, cores 310 can capture the entire range of structural features intersecting the wellbore, from individual fractures to large faults. However, surface seismic data 320 tend to capture only large fracture clusters 330. If the fractures in the area of interest occur in clusters having widths and heights of greater than approximately 10 meters, then processing may continue to step 120.

Figures 4A, 4B, 4C, 4D:
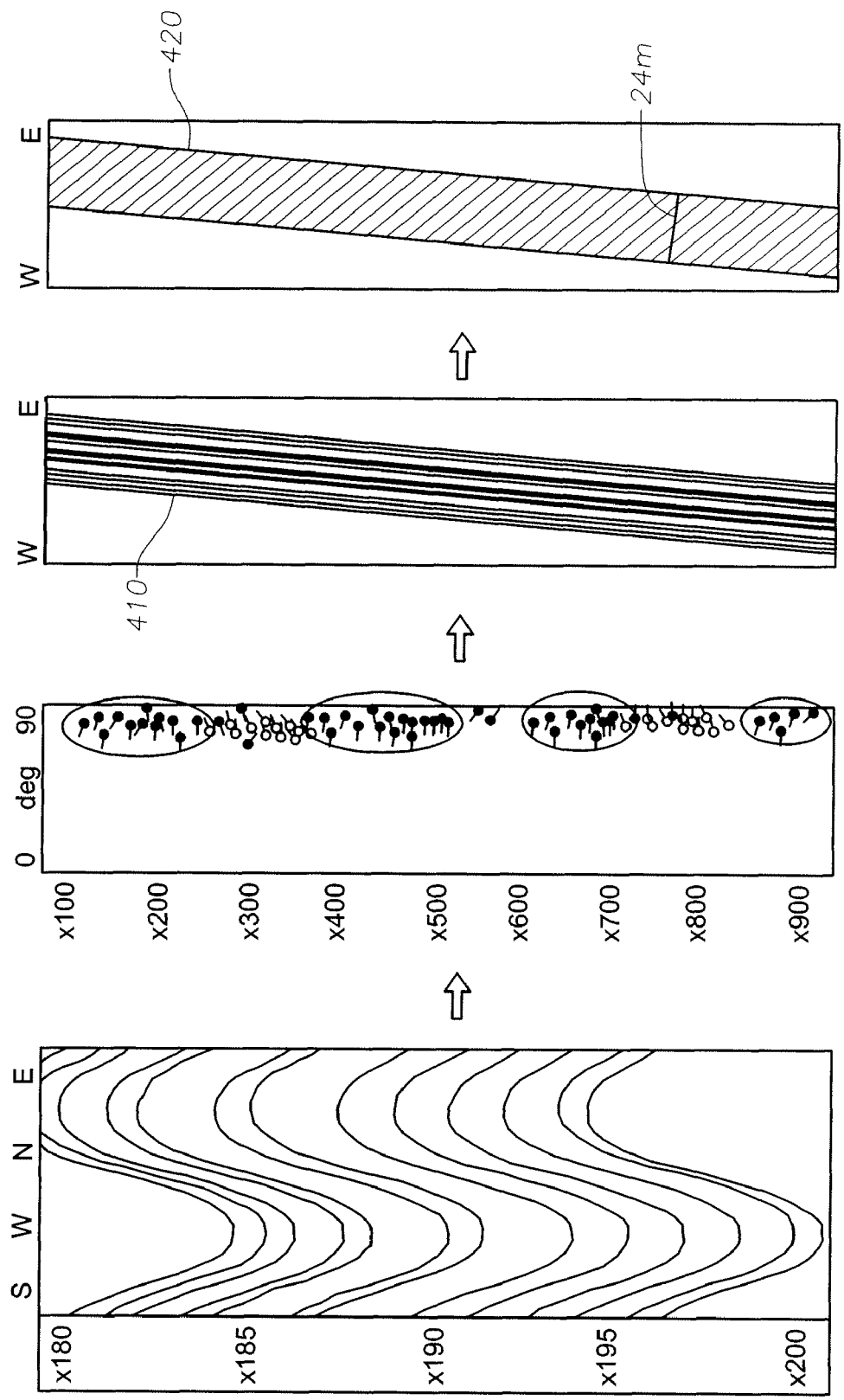
FIGS. 4A-D illustrate the use of borehole image data from a vertical well to determine the mode of occurrence of the fractures in accordance with implementations of various technologies described herein.

In one implementation, the mode of occurrence of the fractures may be determined by analyzing borehole data, such as borehole images, cores, drilling data, sonic logs, well test data and the like. If some or most of the fractures exist in clusters, then the cluster widths and heights may be measured to determine whether the fracture clusters may be detectable in surface seismic data. FIGS. 4A-D illustrate the use of borehole image data from a vertical well to determine the mode of occurrence of the fractures in accordance with implementations of various technologies described herein. FIG. 4A illustrates west dipping open fractures in borehole images in an area of interest as sinusoids. FIG. 4B illustrates the dips of fractures identified from the borehole images. For this illustration, the west dipping fractures will be analyzed. The areas with west dipping fractures are circled. FIG. 4C illustrates the projection of the west dipping fractures onto an east to west plane 410 indicating that the west dipping fractures tend to occur within a near vertical band. FIG. 4D illustrates that the west dipping fractures form a fracture cluster 420 of about 24 meters in width.

At step 120, the nature or type of fractures may be assessed by analyzing borehole data, such as borehole images, cores, drilling data, sonic logs, well test data, production logs, mud loss records and the like. Fracture type may refer to whether the fractures have open or closed apertures and the density of these open or closed apertures. Fracture cluster type may impact reservoir productivity because open fractures may conduct reservoir fluids while closed fractures may act as no-flow boundaries or baffles in the reservoir. Fracture cluster type may be determined by assessing the fractures making up the cluster.

Figure 5:
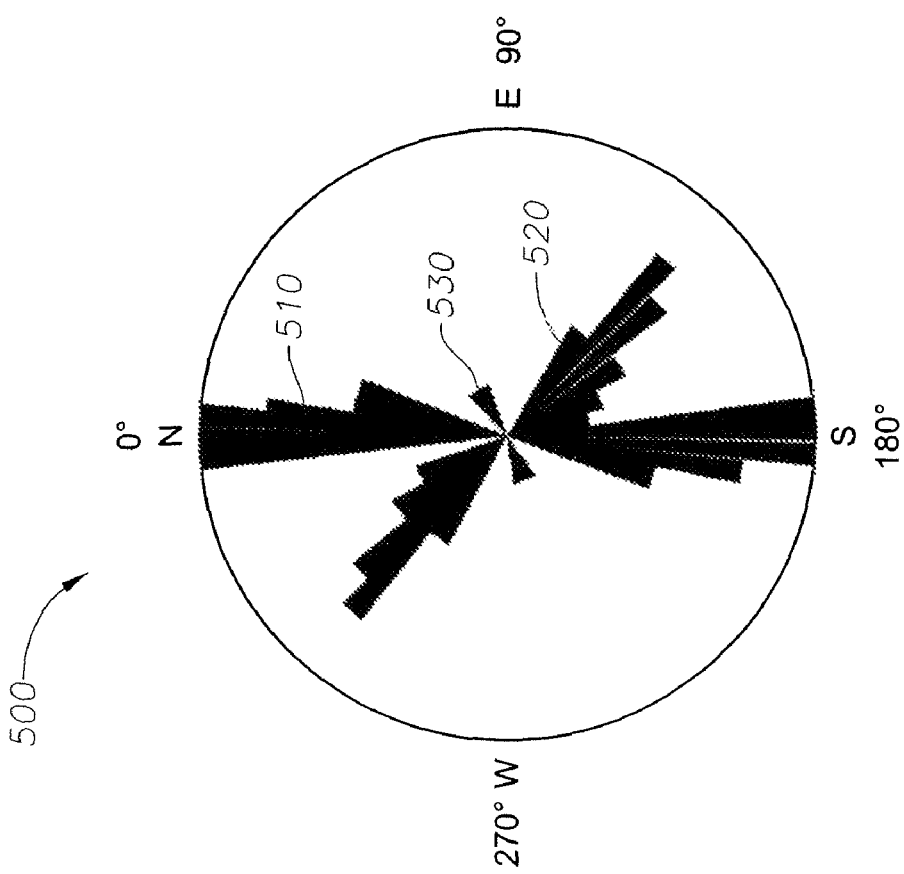
FIG. 5 illustrates a strike rosette of fracture clusters showing the presence of two major fracture cluster sets based on the dominant strike directions in accordance with implementations of various technologies described herein.

At step 130, the strike azimuths of the fracture clusters and the inclinations of the fracture clusters may be assessed by analyzing borehole data, such as borehole images, cores, drilling data, sonic logs, well test data, production logs, mud loss records and the like. Strike azimuth may refer to the direction in which the fracture cluster is dominantly aligned. The fracture clusters may be grouped into sets of fracture clusters with similar strike azimuths. Strike rosettes are statistical plots that may provide information on the major and minor strike azimuths of fracture clusters that are present in the area. FIG. 5 illustrates a strike rosette 500 of fracture clusters showing the presence of two major fracture cluster sets based on the dominant strike directions in accordance with implementations of various technologies described herein. A first major fracture cluster set 510 has a dominant strike direction of north-south and a second major fracture cluster set 520 has a dominant strike direction of northwest-southeast. FIG. 5 also illustrates a minor fracture cluster set 530 with a dominant strike direction of northeast-southwest.

Figure 6:
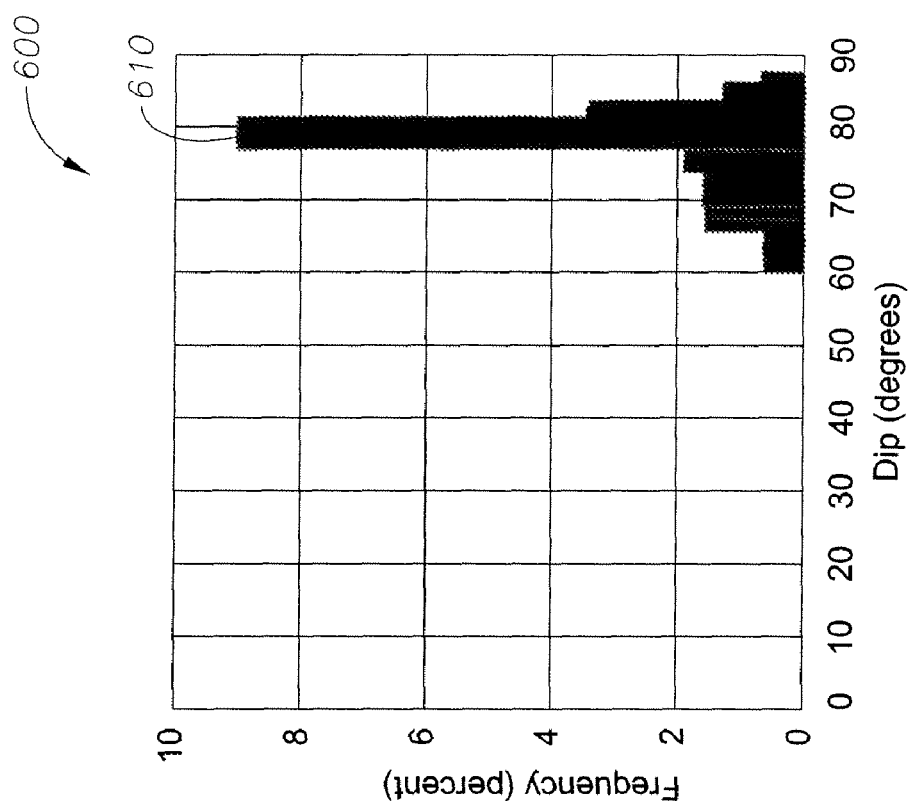
FIG. 6 illustrates a histogram of inclinations of fracture clusters indicating a dominance of fracture clusters with inclinations between approximately 77-82 degrees in accordance with implementations of various technologies described herein.

The inclination may refer to the average angle of the fracture cluster from horizontal. The fracture clusters may be grouped into sets of fracture clusters with similar inclinations. Histograms of the inclination of fracture clusters are statistical plots that may provide dominant ranges of inclinations for the fracture clusters. The inclination of each fracture cluster in an area of interest may be measured and plotted to form a histogram. FIG. 6 illustrates a histogram of inclinations 600 of fracture clusters indicating a dominance of fracture clusters 610 with inclinations between approximately 77-82 degrees in accordance with implementations of various technologies described herein.

The strike azimuth and inclination data may be used to optimize the filters used in the DES processing to be described below in step 140. For example, from FIG. 5, three optimal strike azimuth filters may be determined. A first filter with a range of approximately 330-30 degrees and 150-210 degrees may be used to focus the DES on the first major fracture cluster set 510 with a dominant strike direction of north-south. A second filter with a range of approximately 90-150 degrees and 270-330 degrees may be used to focus the DES on the second major fracture cluster set 520 with a dominant strike direction of northwest-southeast. A third filter with a range of approximately 30-90 degrees and 210-270 degrees may be used to focus the DES on the minor fracture cluster set 530 with a dominant strike direction of northeast-southwest. From FIG. 6, the optimal range for the inclination filter may be determined to be greater than approximately 75 degrees.

At step 140, fracture clusters may be extracted from non-smoothed surface seismic data using DES processing. Non-smoothed surface seismic data may be used because fracture clusters typically cause small disturbances in the seismic data horizons which may typically be filtered or smoothed out during data processing. For optimal results, the seismic data should have a high signal to noise ratio, exhibit high temporal and spatial bandwidth and be free of acquisition footprint that may bias the DES processing.

To extract the fracture clusters, one or more selected seismic attributes may be processed with any DES system. The selected seismic attributes may be any seismic attributes derived from the 3D seismic volume that may be sensitive to fracture clusters. In one implementation, the selected attribute may be the dip-deviation attribute, which may be defined as the deviation of the instantaneous local dip from the dip trend. The DES processing used in step 140 may be described in more detail in commonly assigned US Patent Application Publication No. 20020126896, which is incorporated herein by reference. However, it should be understood that any type of DES processing may be used in step 140.

Figure 7:
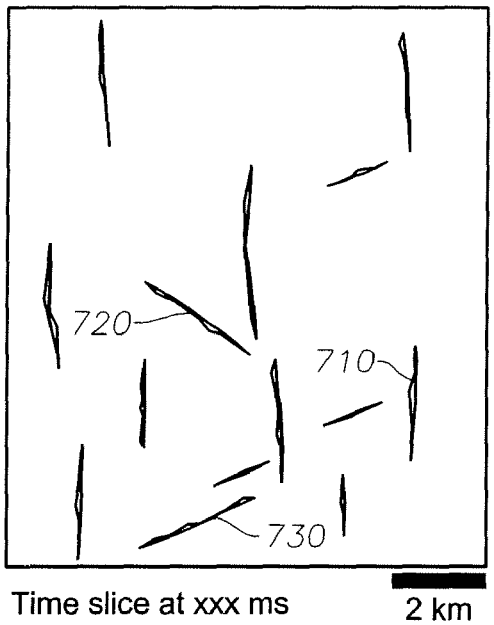
FIG. 7 illustrates a time slice from the 3D volume resulting from DES processing using a strike azimuth filter open to all azimuth ranges and a single range of inclination filter in accordance with implementations of various technologies described herein.
Figure 7:
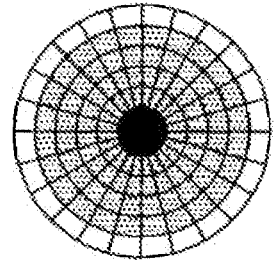

DES may use filters to enhance the extraction process. Filters used by the DES may be optimized based on the strike azimuths and inclinations of the fracture clusters. In one implementation, the seismic data may be processed by the DES using a strike azimuth filter designed to be open to all directions and an inclination filter designed to be open to one particular value or range. The DES processing may yield a 3D volume of fracture clusters. FIG. 7 illustrates a time slice from the 3D volume resulting from DES processing using a strike azimuth filter open to all azimuth ranges and a single range of inclination filter in accordance with implementations of various technologies described herein. Only those fracture clusters that cause the strongest perturbation in the surface seismic data may be output in the 3D volume. For example, in FIG. 7, a fracture cluster with a north-south strike azimuth 710, a fracture cluster with a northwest-southeast strike azimuth 720 and a fracture cluster with a southwest-northeast strike azimuth 730 cause strong enough perturbations to be extracted by the DES processing.

In another implementation, filters may be designed to capture fracture clusters causing less strong perturbations in the surface seismic data. In this implementation, a strike azimuth filter split into a number of ranges or multiple strike azimuth filters, each with a different range, may be used based on the strike azimuth information obtained in step 130. Each range may correspond to the strike azimuth of a specific set of fracture clusters. Likewise, an inclination filter split into a number of ranges or multiple inclination filters, each with a different range, may also be used based on the inclination information obtained in step 130. Each range may correspond to the inclination of a specific set of fracture clusters. Because the DES processing may be focusing on a smaller range of strike azimuths and/or inclinations, fracture clusters causing less strong perturbations may be detected. The seismic data may be processed by the DES separately for each combination of strike azimuth and inclination ranges.

Figure 8A:
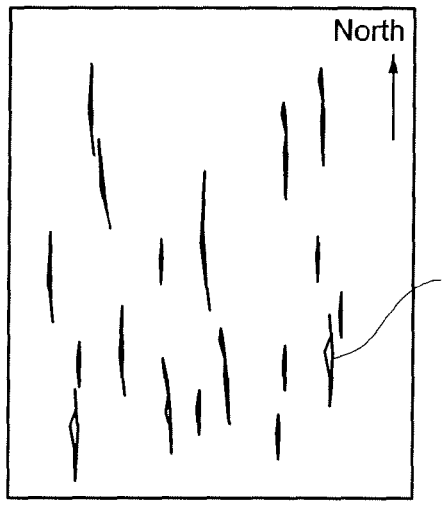
FIGS. 8A-C illustrate time slices from three 3D volumes resulting from DES processing using three different strike azimuth filter ranges and a single range of inclination filter in accordance with implementations of various technologies described herein.
Figure 8A:
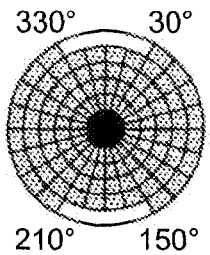
Figure 8B:
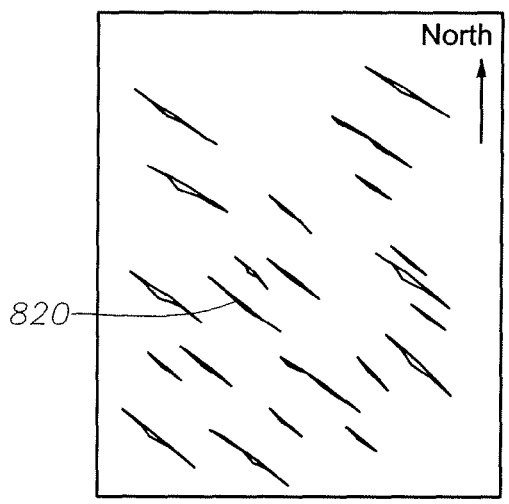
Figure 8B:
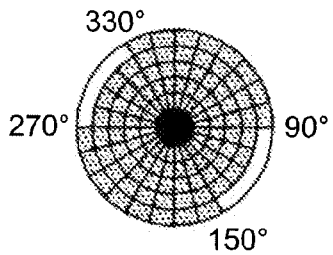
Figure 8C:
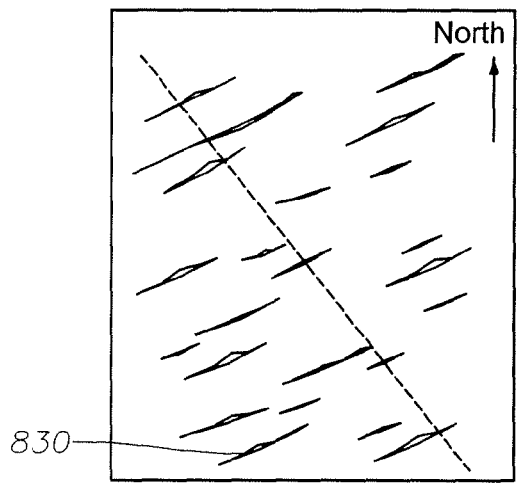
Figure 8C:
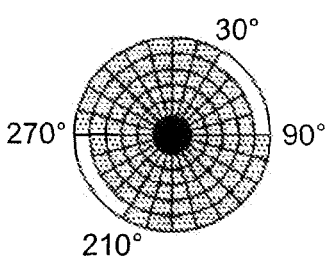

FIGS. 8A-C illustrate time slices from three 3D volumes resulting from DES processing using three different strike azimuth filter ranges and a single range of inclination filter in accordance with implementations of various technologies described herein. In this manner, three sets of fracture clusters with particular strike azimuth ranges may be extracted from the surface seismic data. The output of each run of DES processing is a 3D volume of DES fracture clusters. FIG. 8A illustrates fracture clusters extracted using a strike azimuth filter allowing only the range of 330-30 degrees and 150-210 degrees, i.e., a north-south filter. Fracture cluster 810 is an example of a fracture cluster that may be extracted using the strike azimuth filter of FIG. 8A. FIG. 8B illustrates fracture clusters extracted using a strike azimuth filter allowing only the range of 90-150 degrees and 270-330 degrees, i.e., a northwest-southeast filter. Fracture cluster 820 is an example of a fracture cluster that may be extracted using the strike azimuth filter of FIG. 8B. FIG. 8C illustrates fracture clusters extracted using a strike azimuth filter allowing only the range of 30-90 degrees and 210-270 degrees, i.e., a southwest-northeast filter. Fracture cluster 830 is an example of a fracture cluster that may be extracted using the strike azimuth of FIG. 8C. In some implementations, the 3D volume output of the first run of DES processing may be used as input to a second run of DES processing to enhance the mapping of fracture clusters.

Figure 9:
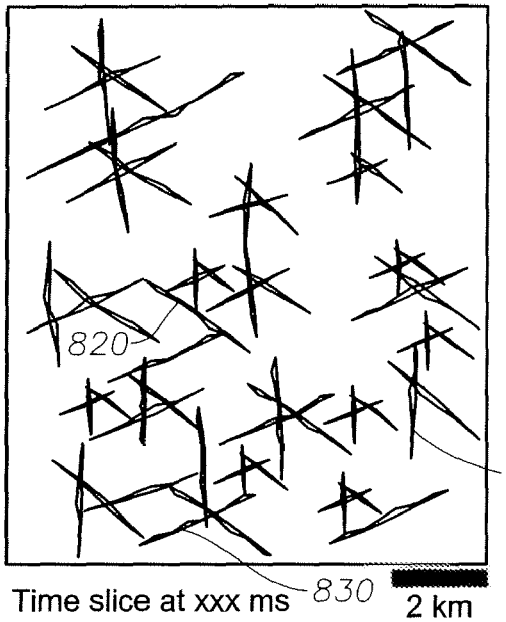
FIG. 9 illustrates a time slice from the combined 3D volume of the DES results in accordance with implementations of various technologies described herein.
Figure 9:
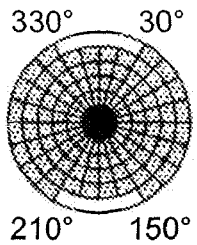
Figure 9:
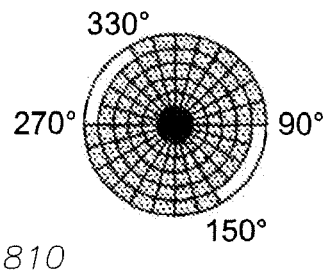
Figure 9:
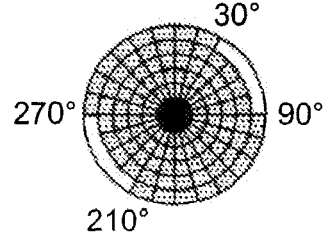

At step 150, the 3D volume outputs from each DES processing run may be combined into a single 3D volume. In this manner, one 3D volume may be constructed containing all the fracture clusters present in the area of the interest. FIG. 9 illustrates a time slice from the combined 3D volume of the DES results in accordance with implementations of various technologies described herein. In this example, FIGS. 8A-C illustrate the same time slice. Thus, FIG. 9 may be the result of combining FIGS. 8A-C, the north-south fracture cluster 810, the northwest-southeast fracture cluster 820 and the southeast-northwest fracture cluster 830 may be identified. Note also the enhanced result of using multiple DES processing runs with strike azimuth filters open to varying ranges, as shown in FIG. 9, compared to using a single DES processing run with a strike azimuth filter open in all directions as shown in FIG. 7.

Figure 10:
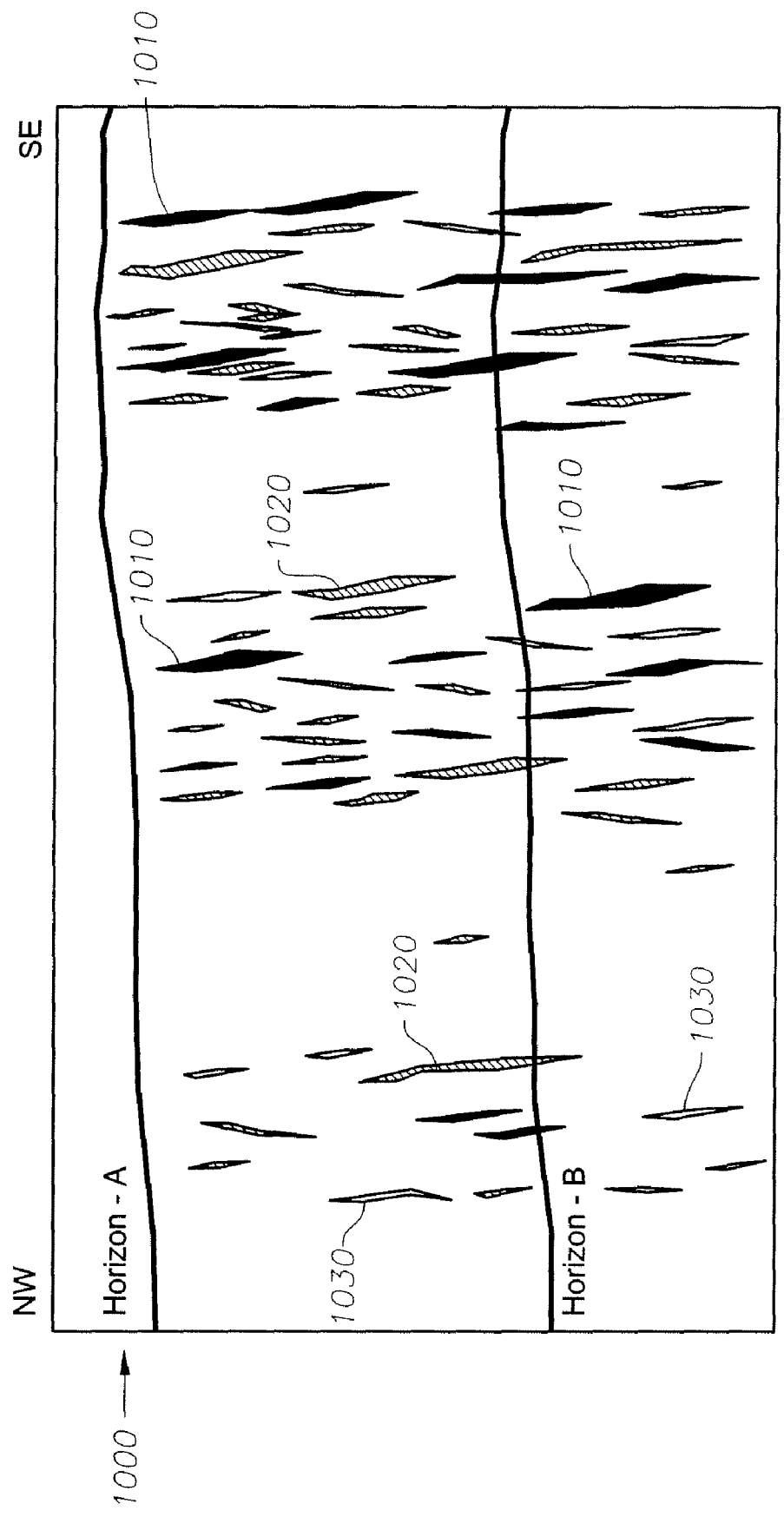
FIG. 10 illustrates a cross-sectional view of a combined 3D volume with fracture cluster densities defined in accordance with implementations of various technologies described herein.

At step 160, each fracture cluster in the combined 3D volume of step 150 may be assigned a density value based on the strength of the fracture cluster's seismic response. The fracture cluster strength may range from +1 being very strong and −1 being very weak. For example, FIG. 10 illustrates a cross-sectional view of a combined 3D volume 1000 with fracture cluster densities defined in accordance with implementations of various technologies described herein. Each line in FIG. 10 represents a fracture cluster. Very strong fracture clusters 1010, illustrated in black, may be assumed to have a high fracture density on the order of greater than 200 fractures per 50 meters window length normal to fractures strike. Medium strength fracture clusters 1020, illustrated in a cross-hatch pattern, may be assumed to have a medium fracture density on the order of between 50 and 200 fractures per 50 meters window length normal to fractures strike. Low strength fracture clusters 1030, illustrated in white, may be assumed to have a low fracture density on the order of less than 50 fractures per 50 meters window length normal to fractures strike.

Figure 11:
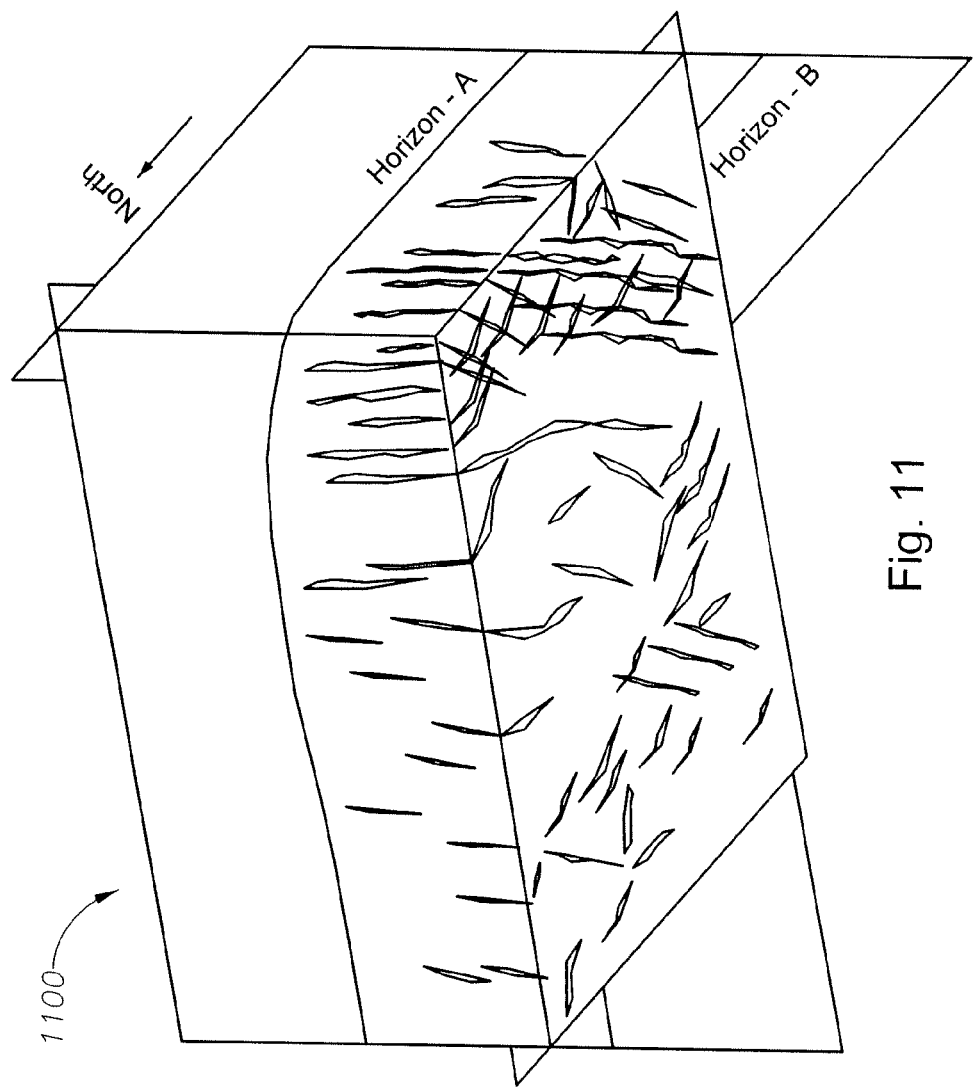
FIG. 11 illustrates a combined 3D volume that may be used to determine the length, height and width of fracture clusters in accordance with implementations of various technologies described herein.

At step 170, the length, height and width of each fracture cluster may be determined. FIG. 11 illustrates a combined 3D volume 1100 that may be used to determine the length, height and width of fracture clusters in accordance with implementations of various technologies described herein. The length, height and width of fracture clusters may be used as input to discrete fracture network (DFN) modeling.

In one implementation, computing modules may be added to existing DES in accordance to technologies described herein. For example, a software module designed to allow for ranges of inclination filters to be used as described in step 140 may be added. As another example, a software module designed to assign and display density values to each fracture cluster as described in step 160 may be added. As still another example, a software module designed to determine fracture cluster length, height and width as described in step 170 may also be added.

Figure 12:
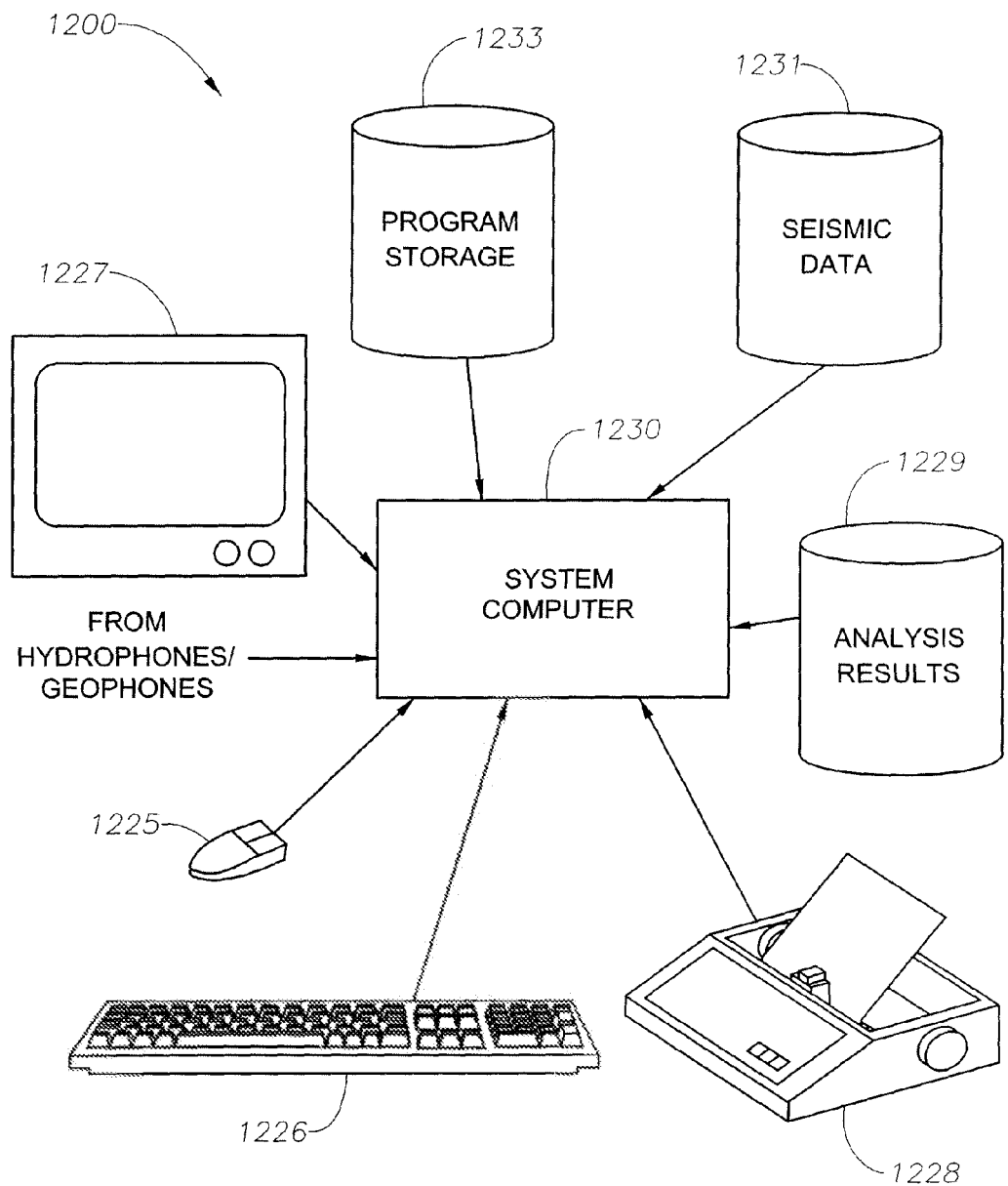
FIG. 12 illustrates a computer system, into which implementations of various technologies described herein may be implemented.

FIG. 12 illustrates a computer system 1200, into which implementations of various technologies described herein may be implemented. The computer system 1200 may include one or more system computers 1230, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 1230 may be in communication with disk storage devices 1229, 1231, and 1233, which may be external hard disk storage devices. It is contemplated that disk storage devices 1229, 1231, and 1233 are conventional hard disk drives, and as such, will be implemented by way of a local area network or by remote access. Of course, while disk storage devices 1229, 1231, and 1233 are illustrated as separate devices, a single disk storage device may be used to store any and all of the program instructions, measurement data, and results as desired.

In one implementation, seismic data from the receivers may be stored in disk storage device 1231. The system computer 1230 may retrieve the appropriate data from the disk storage device 1231 to process seismic data according to program instructions that correspond to implementations of various technologies described herein. The program instructions may be written in a computer programming language, such as C++, Java and the like. The program instructions may be stored in a computer-readable medium, such as program disk storage device 1233. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1230. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1230 may present output primarily onto graphics display 1227, or alternatively via printer 1228. The system computer 1230 may store the results of the methods described above on disk storage 1229, for later use and further analysis. The keyboard 1226 and the pointing device (e.g., a mouse, trackball, or the like) 1225 may be provided with the system computer 1230 to enable interactive operation.

The system computer 1230 may be located at a data center remote from the survey region. The system computer 1230 may be in communication with the receivers (either directly or via a recording unit, not shown), to receive signals indicative of the reflected seismic energy. These signals, after conventional formatting and other initial processing, may be stored by the system computer 1230 as digital data in the disk storage 1231 for subsequent retrieval and processing in the manner described above. While FIG. 12 illustrates the disk storage 1231 as directly connected to the system computer 1230, it is also contemplated that the disk storage device 1231 may be accessible through a local area network or by remote access. Furthermore, while disk storage devices 1229, 1231 are illustrated as separate devices for storing input seismic data and analysis results, the disk storage devices 1229, 1231 may be implemented within a single disk drive (either together with or separately from program disk storage device 1233), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying one or more fracture clusters in an area of interest, comprising:
   (a) determining a first inclination of each fracture cluster using borehole data, wherein the first inclination refers to a first average angle of a corresponding fracture cluster with respect to horizontal; and
   (b) extracting, using a microprocessor, a first set of fracture clusters from seismic data using a filter based on the first inclination and a strike azimuth of each fracture cluster, wherein the strike azimuth refers to a direction in which the corresponding fracture cluster is dominantly aligned.

2. The method of claim 1, wherein the first set of fracture clusters is extracted from one or more seismic attributes sensitive to the fracture clusters.

3. The method of claim 2, wherein the seismic attributes sensitive to the fracture clusters comprise dip deviations.

4. The method of claim 1, wherein extracting the first set of fracture clusters comprises generating a first three dimensional (3D) volume of fracture clusters based on the first inclination.

5. The method of claim 4, further repeating steps (a)-(b) for a second inclination.

6. The method of claim 5, further comprising extracting a second set of fracture clusters from the seismic data to generate a second three dimensional (3D) volume of fracture clusters based the second inclination.

7. The method of claim 6, further comprising combining the first 3D volume of fracture clusters with the second 3D volume of fracture clusters into a combined 3D volume of fracture clusters.

8. The method of claim 7, further comprising assigning a density value to each fracture cluster in the combined 3D volume of fracture clusters.

9. The method of claim 7, further comprising determining at least one of length, height and width of each fracture cluster in the combined 3D volume of fracture clusters.

10. The method of claim 1, wherein the strike azimuth is open in all directions.

11. The method of claim 1, further comprising:
determining a first strike azimuth for each fracture cluster using the borehole data; and
wherein the first set of fracture clusters is extracted using a filter based on the first strike azimuth and on the first inclination.

12. The method of claim 11, wherein extracting the first set of fracture clusters from the seismic data comprises generating a first three dimensional (3D) volume of fracture clusters based on the first inclination and the first strike azimuth.

13. The method of claim 12, further repeating:
determining a second strike azimuth for each fracture cluster using the borehole data; and
extracting a second set of fracture clusters from the seismic data using a filter based on the second strike azimuth.

14. The method of claim 13, wherein extracting the second set of fracture clusters comprises generating a second three dimensional (3D) volume of fracture clusters based on the second strike azimuth.

15. The method of claim 14, further comprising combining the first 3D volume of fracture clusters with the second 3D volume of fracture clusters into a combined 3D volume of fracture clusters.

16. A computer system, comprising:
a processor; and
a memory comprising program instructions executable by the processor to:
determine one or more strike azimuths of one or more fracture clusters using borehole data, wherein the strike azimuths refer to one or more directions in which the fracture clusters are dominantly aligned;
extract one or more fracture clusters from seismic data using one or more filters based on the strike azimuths;
determine one or more inclinations of the fracture clusters using the borehole data; and
extract the fracture clusters using one or more filters based on the inclinations and the strike azimuths.

17. The computer system of claim 16, wherein the memory further comprises program instructions executable by the processor to combine the fracture clusters into a three dimensional volume.

18. The computer system of claim 17, further comprising assigning a density value to each fracture cluster in the combined 3D volume.

19. The computer system of claim 17, further comprising determining at least one of length, height and width of each fracture cluster in the combined 3D volume.

20. A computer-readable medium having stored thereon computer-executable instructions which, when executed by a computer, cause the computer to:
determine a mode of occurrence for each fracture in an area of interest;
determine one or more strike azimuths and one or more inclinations for each fracture cluster; and
extract one or more three dimensional volumes of fracture clusters from seismic data using one or more filters based on the one or more strike azimuths and one or more inclinations.

21. The computer-readable medium of claim 20, further comprising computer-executable instructions which, when executed by a computer, cause the computer to determine a fracture type of each fracture.

22. The method of claim 1, wherein each fracture cluster in the extracted first set of fracture clusters causes one or more perturbations in the seismic data.

23. The method of claim 22, wherein the filter is configured to capture each fracture cluster in the extracted first set of fracture clusters.

* * * * *